Aug. 25, 1964    D. B. KREIDER    3,145,753
SPRING CLIP AND NUT ASSEMBLY
Filed Jan. 24, 1961
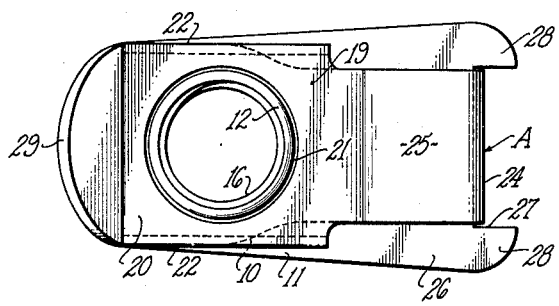
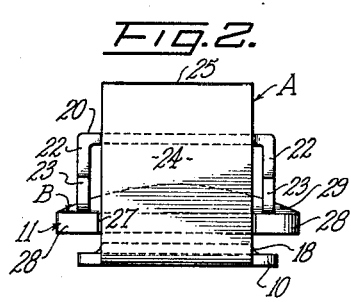
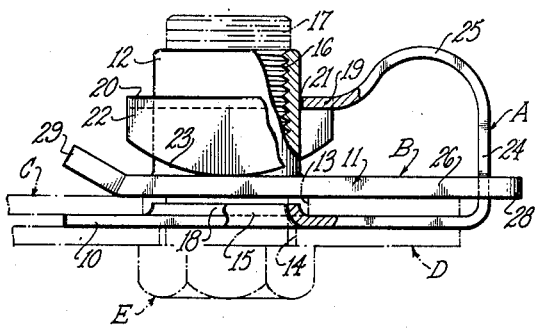
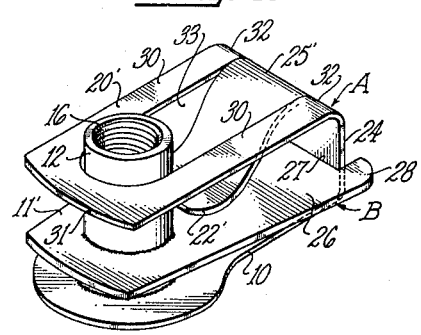
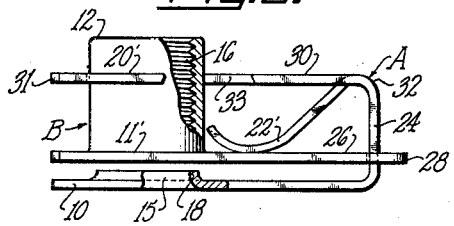
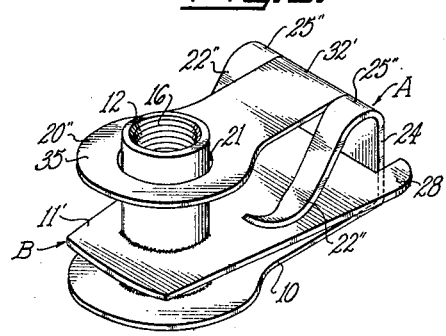
INVENTOR.
DAVID B. KREIDER
BY
ATTORNEY United States Patent Office 3,145,753
Patented Aug. 25, 1964

3,145,753
SPRING CLIP AND NUT ASSEMBLY
David B. Kreider, Anaheim, Calif., assignor to
Frederick W. Rohe, Placentia, Calif.
Filed Jan. 24, 1961, Ser. No. 84,573
5 Claims. (Cl. 151—41.75)

This application is a continuation in part of my pending application S.N. 69,034 filed Nov. 14, 1960, for Clip Nut, Docket 659, and of my earlier applications S.N. 799,316, filed March 13, 1958, for Clip Nut, both now abandoned.

This invention relates generally to an assembly of nut and clip for holding the same to a work sheet, commonly referred to as a "clip nut." More specifically, the invention relates to the type of clip nut disclosed in the application of David B. Kreider, Serial No. 799,316, filed March 13, 1959, wherein the nut is carried by one of a pair of opposed jaws which are separate parts and are loosely coupled to one another for closing and opening movements of a free-floating character wherein the jaws may maintain parallel relationship for full seating contact with the opposite faces of the work sheet embraced by them.

More specifically, the invention provides an improved clip nut embodying a clip-on type of holder comprising separate jaws linked to one another at one end of the holder and spring loaded toward one another in such a manner as to accomplish self alignmnet of the jaws in substantially full seating contact with opposite faces of the work sheet to which the holder is clipped, and yieldingly maintaining a tight clamping engagement with the work sheet pending the operation of inserting a bolt through another work sheet or other part, and thence through the nut clip and its supporting work sheet, and tightening the bolt to clamp these parts tightly together.

The invention provides a clip nut assembly that in many instances is adapted to replace a nut plate or a clinch nut, as well as any more conventional type of clip nut.

A specific object is to provide a clip nut assembly adaptable to a wide range of panel thicknesses, as contrasted to the rather narrow range of panel thicknesses to which the conventional clip nut is restricted because of an inherent angularity problem involved in opening the jaws thereof. More specifically, the invention aims to provide a clip nut assembly wherein the nut will remain centered at all times on the same axis with respect to the clip base, and always perpendicular to the base, regardless of the size of panel on which it is installed.

A further object is to provide a clip nut assembly characterized by greater ease of installation than in the case of the conventional clip nut.

An important object of the present invention is to provide a simplified arrangement of free-floating, separate jaw type clip and nut assembly, wherein the nut is an integral part of a floating jaw, at one end thereof, wherein the other jaw constitutes one arm of a spring yoke having another arm embodying a spring finger for loading the floating jaw, and wherein the two jaws are maintained in longitudinal registration by a free-floating coupling consisting in a transversely slidable retainer connection between the nut and the other arm at one end of the assembly and a corresponding transversely slidable connection between the other end of the floating jaw and a transverse guide portion of the spring yoke.

Other objects and advantages will become apparent in the ensuing specifications and appended drawing, in which:

FIG. 1 is a plan view of a clip nut assembly embodying the invention;

FIG. 2 is an end view of the same, viewing the rightward end of FIG. 1;

FIG. 3 is a side elevational view of the same with parts broken away and shown in section;

FIG. 4 is a perspective view of a modified form of the invention;

FIG. 5 is a side elevational view of the clip nut of FIG. 4, with parts broken away and shown in section; and FIG. 6 is a perspective view of a clip nut embodying a further modified form of the invention.

*General Description of Invention*

Referring now to the drawings in detail, and to the several views thereof collectively, the invention in each case is embodied in a clip nut assembly comprising, in general, a yoke component A having a base jaw 10 as one arm thereof; and a floating jaw component B comprising a floating jaw or nut plate 11 and a nut 12 formed integrally with one end thereof; adapted to be clipped to a work sheet C having a bolt aperture 13 therein and to be temporarily attached thereto by light clamping engagement of the jaws 10 and 11 against opposite faces thereof; and to thereafter be attached to a second work sheet D or other part by means of a bolt E extended through an aperture 14 in the work sheet D, thence through an aperture 15 in the base jaw 10 and thence into the nut 12 which is internally threaded at 16 to receive the threaded shank 17 of the bolt. Base jaw aperture 15 is defined by a circular collar 18 upstruck from jaw 10.

Light yielding clamping of the work sheet C between the jaws 10 and 11 is provided for by a spring finger 19 which is embodied in the other arm of yoke A. A slidable retainer connection between the nut 12 and one end of the yoke A is also provided by said other arm. The features, in several modified forms thereof, will be described more fully in the ensuing

*Detailed Description*

Preferred form—FIGS. 1–3.—Referring now to FIGS. 1–3, in the preferred form of the invention, the other arm of yoke A embodies a single spring finger 19 embodying at its end a retainer loop 20 defining an aperture 21 through which the nut 12 freely extends; and a pair of wings 22, formed integrally with the loop 20, are bent at right angles thereto from the respective side margins thereof toward the base jaw 10, and extend into bearing engagement with the outer face of floating jaw 11. The single finger 19 functions both as a retainer to position the one end of the floating jaw 11 and the nut 12 in proper registration with the opposed end of base jaw 10 and its aperture 15 therein; and as a spring finger to exert light yielding pressure against the floating jaw 11.

Wings 22 are provided with bearing edges 23 of rocker form, adapted to maintain the pressure contact against floating jaw 11 centered on a transverse line substantially intersecting the axis of nut 12.

At its opposite end, yoke A includes a bridge, integrally joining the base jaw 10 to spring finger 19, bent at right angles to the jaw 10 and providing a guide 24 for the opposite end of jaw 11. Guide 24, in this form of the invention, is joined to the finger 19 by an arch 25 of S-configuration, adding resiliency to the yoke.

In the yoke A, the rear portions thereof (arch 25, guide 24 and rear part of base jaw 10) are narrowed for increased resiliency and for reception of guide 24 in notch 27, and the forward portions thereof (retainer finger 20 and aperture portion of base jaw 10) are widened so as to embrace the apertures 15 and 21.

The nut 12 is preferably of cylindrical sleeve form as shown, and, to conform to its circular cross section, the aperture 21 is circular. This construction is preferred because of its simplicity (it makes it possible to fabricate the nut by extruding it from the flat sheet metal body of jaw 11 in a deep-drawing operation); although it will be understood that, as an alternate, but more costly construction, it would be possible to utilize a nut having a polyhedral external surface, with a corresponding polygonal configuration in the aperture 21. The jaw 11 is in the form of a flat plate of approximately rectangular shape, with side margins converging to minimum width at the forward end which carries nut 12, and widened at the other end to provide a tail 26 which is formed with a transversely extending shallow notch 27 defined between retainer lugs 28. Guide 24 is received in notch 27 and is laterally positioned between lugs 28, thus providing a free-floating connection between the tail 26 and the yoke A. This connection cooperates with the free-floating connection between the nut 12 and retainer loop 20 to maintain the floating jaw B longitudinally aligned with the base jaw 10, while permitting free-floating opening and closing movements of the jaws 10 and 11 with respect to one another, for application of the clip nut to work sheets C of widely varying thicknesses. The forward end of jaw 11 is provided with a lip 29 which is bent toward the nut 12, so as to define with the forward end of base jaw 10 a flaring mouth to facilitate the reception of the edge of work sheet C as the clip is applied thereto. The angle subtended between lip 29 and jaw 10 is preferably less than 45° and may be any angle between 45° and 0° (parallelism).

In the construction of the clip nut assembly, the components A and B are fabricated separately by suitable sheet metal stamping, forming and drawing operations, and are then assembled by spreading the finger 19 away from base jaw 10 to a sufficient height so that the nut 12 will clear the outer end of loop 20 when jaw 11 is seated against boss 18, and the floating jaw component B is then inserted into the yoke A by placing the tail 26 on the boss 18 and sliding it longitudinally toward the guide 24 until the latter is received in notch 27 and nut 12 is in registration with aperture 21, whereupon the finger 19 is released for movement toward the base jaw 10, causing the nut 12 to enter the aperture 21 and thereby attaching the components A and B to one another.

*Modified form—FIGS. 4 and 5.*—The clip nut of FIGS. 4 and 5 is the same as that of FIGS. 1–3 as to parts indicated by the same reference numerals, and differs therefrom in that retainer loop 20' and spring tongue 22' are formed as separate parts of one arm of yoke A, the base jaw 10 being the other arm thereof. The retainer loop 20' is of rectangular form, comprising a pair of laterally spaced retainer bars 30 in the form of straight strips joined at their forward ends by a transverse web 31 and joined by integral bends 32 at their rear ends to the upper extremity of guide 24, and the respective sides thereof. Spring tongue 22' is joined by an integral arch 25' to the central portion of the upper end of guide 24, between the bends 32. The spring tongue 22' and its connecting arch 25' are of S-curvature as shown and are fabricated by a lancing operation wherein they are struck from the central area of retainer loop 20', leaving therein a rectangular opening 33 in the forward portion of which the nut 12 is retained. Rearward shifting of the nut 12 in the opening 33 is prevented by engagement of tail 26 against guide 24 (or, optionally, by engagement of nut 12 against the forward end of spring tongue 22', which approaches closely to the nut as shown in FIG. 5).

Floating jaw 11' differs from jaw 11 of FIGS. 1–3 in that it lies entirely in a single plane, dispensing with the flaring lip 29. Spring tongue 22' has a convex bearing face of rocker form, in yielding engagement with the jaw 11'.

The assembly and use of the clip nut of FIGS. 4, 5, are substantially the same as in the clip nut of FIGS. 1–3.

*Modified form—FIG. 6.*—The clip nut of FIG. 6 differs from that of FIGS. 1–3 in that the guide tongue 35 and spring fingers 22" are formed as separate parts of the one arm of yoke A, as in FIGS. 4 and 5, but differ from the clip nut of FIGS. 4 and 5 in that the guide tongue 35 constitutes the central portion of the one arm and the spring fingers 22" constitute the lateral portions of the one arm, lanced away from the central portion 35 by a lancing and forming operation in which they are bent downwardly and formed to S-curvature. Their arcuate tips yieldingly bear against the jaw 11' in the assembly. Jaw 11' is shown as being the same as the jaw 11' of FIGS. 4, 5. Spring fingers 22" are joined by arches 25" to the upper end of guide 24 at the sides thereof, and guide tongue 35 is joined by a bend 32' to the central portion of the upper end of guide 24. The forward end of guide tongue 35 is widened and formed as a circular flat ring 20' having a circular nut receiving aperture 21. The forward ends of spring fingers 22' are correspondingly narrowed to substantially pointed form as shown.

The assembly and use of the clip nut of FIG. 6 are substantially the same as with the other embodiments of the invention and accordingly will not be described in detail.

I claim:

1. In a clip nut assembly for attachment to a work sheet having a bolt aperture, in combination: a yoke comprising opposed spaced arms one of which constitutes a base jaw having a bolt opening for alignment with said aperture, and a guide integrally joining the rear ends of said arms and extending transversely therebetween, the other arm embodying a spring finger extending from said guide and a retainer loop formed as a free end portion of said spring finger, said retainer loop being coaxial with said bolt opening and having spaced lateral wings extending substantially at right angles from respective side margins thereof toward said base jaw and terminating in convex arcuate edges in opposed relation to said base jaw; and a floating jaw having a rear end embodying retainer means having an open shallow transverse notch slidably receiving said guide, and a nut carried by said floating jaw, projecting through said retainer loop, guided therein for axially sliding movement coaxial with said bolt opening, and cooperating with said retainer means and guide to guide said jaws in free-floating closing movement against opposite faces of a work sheet in self-adjusting full contact therewith while maintaining longitudinal registration of the jaws, said lateral wings having their said arcuate edges engaged against said floating jaw on opposite sides of said nut and spring-loading said floating jaw for yielding gripping engagement with said work sheet.

2. A clip nut as defined in claim 1, wherein said guide is disposed largely in a plane at right angles to the plane of said base jaw and to the longitudinal axis of the assembly, and has parallel side margins loosely fitted between the lateral extremities of said transverse notch.

3. A clip nut assembly as defined in claim 1, wherein said retainer means comprises a pair of laterally spaced lugs defining said shallow transverse notch in the rear end of said floating jaw.

4. A clip nut assembly as defined in claim 1, wherein said nut is integrally joined at one end to said floating jaw and projects therefrom, at right angles to the plane thereof.

5. A clip nut as defined in claim 1, wherein said nut is in the form of a cylindrical, internally threaded sleeve projecting from the body of said floating jaw at right angles to the plane thereof, and wherein said retainer loop has a circular aperture in which said nut is loosely fitted.

References Cited in the file of this patent

UNITED STATES PATENTS

| 2,159,573 | Tinnerman | May 23, 1939 |
| 2,274,014 | Tinnerman | Feb. 24, 1942 |
| 2,303,148 | Tinnerman | Nov. 24, 1942 |
| 2,394,729 | Tinnerman | Feb. 12, 1946 |
| 2,590,450 | Parsons | Mar. 25, 1952 |
| 2,888,971 | Wootton | June 2, 1959 |

FOREIGN PATENTS

| 1,236,404 | France | June 7, 1960 |